United States Patent [19]

Kennedy, Sr.

[11] 4,268,050

[45] May 19, 1981

[54] SKI ACCESSORY TRANSPORTATION AND STORAGE SYSTEM

[76] Inventor: Richard B. Kennedy, Sr., 771 Woods Rd., Pasadena, Md. 21122

[21] Appl. No.: 61,420

[22] Filed: Jul. 27, 1979

[51] Int. Cl.³ .......................... B62B 1/12; B60R 9/12
[52] U.S. Cl. .................................. 280/38; 224/42.01;
224/324; 224/917; 280/47.19; 280/652;
280/814
[58] Field of Search .................. 280/47.19, 651, 652,
280/655, 814, 40, 38, DIG. 6; 224/42.01, 329,
324, 309, 917

[56] References Cited

U.S. PATENT DOCUMENTS

| | | |
|---|---|---|
| 2,518,803 | 8/1950 | Marvin .................................. 280/40 |
| 2,701,725 | 2/1955 | Meiklejohn ........................... 280/38 |
| 2,999,378 | 12/1961 | Blair ..................................... 280/814 |
| 3,504,921 | 4/1970 | Osmond ........................... 224/329 X |
| 4,084,735 | 4/1978 | Kappas ............................. 224/917 X |
| 4,114,915 | 9/1978 | Lello et al. ...................... 280/47.19 |

FOREIGN PATENT DOCUMENTS

| | | |
|---|---|---|
| 140352 | 2/1951 | Australia ...................... 280/DIG. 6 |
| 1025705 | 4/1966 | United Kingdom ......... 280/DIG. 6 |

*Primary Examiner*—David M. Mitchell
*Assistant Examiner*—Milton L. Smith
*Attorney, Agent, or Firm*—Morton J. Rosenberg

[57] ABSTRACT

A ski accessory transportation and storage system (10) for transportation and storage of skis (12) and various ski parephernalia. The ski accessory transportation and storage system (10) includes a housing formed of a central frame member (20) extending in a vertical direction (22). An upper support member (24) and a lower support member (38) extending in a transverse direction (26) are coupled in fixed relation to the central frame member (20). A ski capturing mechanism (48) is mounted both on the upper support member (24) and the central frame member (20) and includes a plurality of U-shaped channels or ski bracket members (50) within which skis (12) are vertically inserted. The ski capturing mechanism (48) further includes a ski locking mechanism rotationally coupled to the central frame member (20) and lockingly engageable with both the upper support member (24) and the lower support member (38). The system (10) further includes a wheel mechanism (90) which allows wheel members (100) to be rotationally displaced to either a stored position or to a usable position for rolling contact with a base surface (102). In this manner, system (10) may be used for carrying and transportation of various ski paraphernalia by manual actuation of the user as well as providing a storage container adapted for releasable contact with a vehicle roof (16) for transportation of the ski paraphernalia over long distances.

11 Claims, 5 Drawing Figures

SKI ACCESSORY TRANSPORTATION AND STORAGE SYSTEM

BACKGROUND OF THE INVENTION

1. Field of the Invention

This invention pertains to transportation systems. In particular, this invention pertains to transportation systems where ski paraphernalia may be contained and moved over various distances. Still further, this invention relates to a ski accessory transportation and storage system which is adapted for collapsibility into a storage-like mode in order to releasably secure such to a vehicle roof. Further, this invention relates to a ski accessory transportation and storage system, which may be stored over long periods of time in a storage housing. Additionally, this invention pertains to a ski accessory transportation and storage system where ski boots, ski poles, skis, and various other ski paraphernalia may be categorically stored by the skier in a rolling displacement vehicle.

2. Prior Art

Transportation vehicles to contain various sporting goods are known in the art. As an exemplary system, golf carts for rolling contact to be manually actuatable are known. The best prior art known to applicant in the field of accessory transportation and storage systems, as applied to the subject invention concept, include U.S. Pat. Nos.: 2,883,207; 2,855,208; 3,272,413; 2,957,700; 2,732,218; 2,662,776; 2,578,409; 2,507,234; 3,776,437; 4,142,736; 4,033,460; 4,050,706; 4,084,735; and, 3,897,895.

In some prior art, such as that shown in U.S. Pat. No. 4,084,735, ski cases and rack systems are provided which may be mounted to the upper surfaces of a motor vehicle. Such ski cases provide for pluralities of brackets within which the skis may be mounted. Further, such systems do provide for straps and suction cup coupling, however, such prior art systems of this type do not provide for a removable storage containment and transportation system which may be taken from the vehicle and manually rolled to a skiing location.

Other carrier systems, such as that shown in U.S. Pat. No. 3,776,437, are directed to carriers which are mounted to the roofs of vehicles through suction cups. Bifurcate elements are provided within which the skis may be inserted. However, such prior art does not provide for a convertible wheel ski carrying system, for the dual purpose of transportation and storage, as well as for rolling displacement.

Other prior art systems, such as that shown in U.S. Pat. No. 2,578,409 are directed to golf cart systems. However, such systems are not foldable to a storage mode and are not adapted for releasable securement to a vehicle roof, as provided in the subject invention concept.

SUMMARY OF THE INVENTION

A ski accessory transportation and storage system for transportation and storage of skis and ski paraphernalia, which includes a central frame member extending substantially in a vertical direction. Further included is an upper support member secured to the central frame member and extending in a transverse direction with respect to the vertical direction. A lower support member is secured to the central frame member and extends in the transverse direction and is further displaced from the upper support member in the vertical direction. A ski capturing mechanism for capturing the skis between the upper support member, the lower support member, and the central frame member, is provided. Additionally, a wheel mechanism is coupled to the upper and lower support members for rolling displacement of the ski accessory transportation and storage system.

DESCRIPTION OF THE PREFERRED EMBODIMENTS

Figure 1:
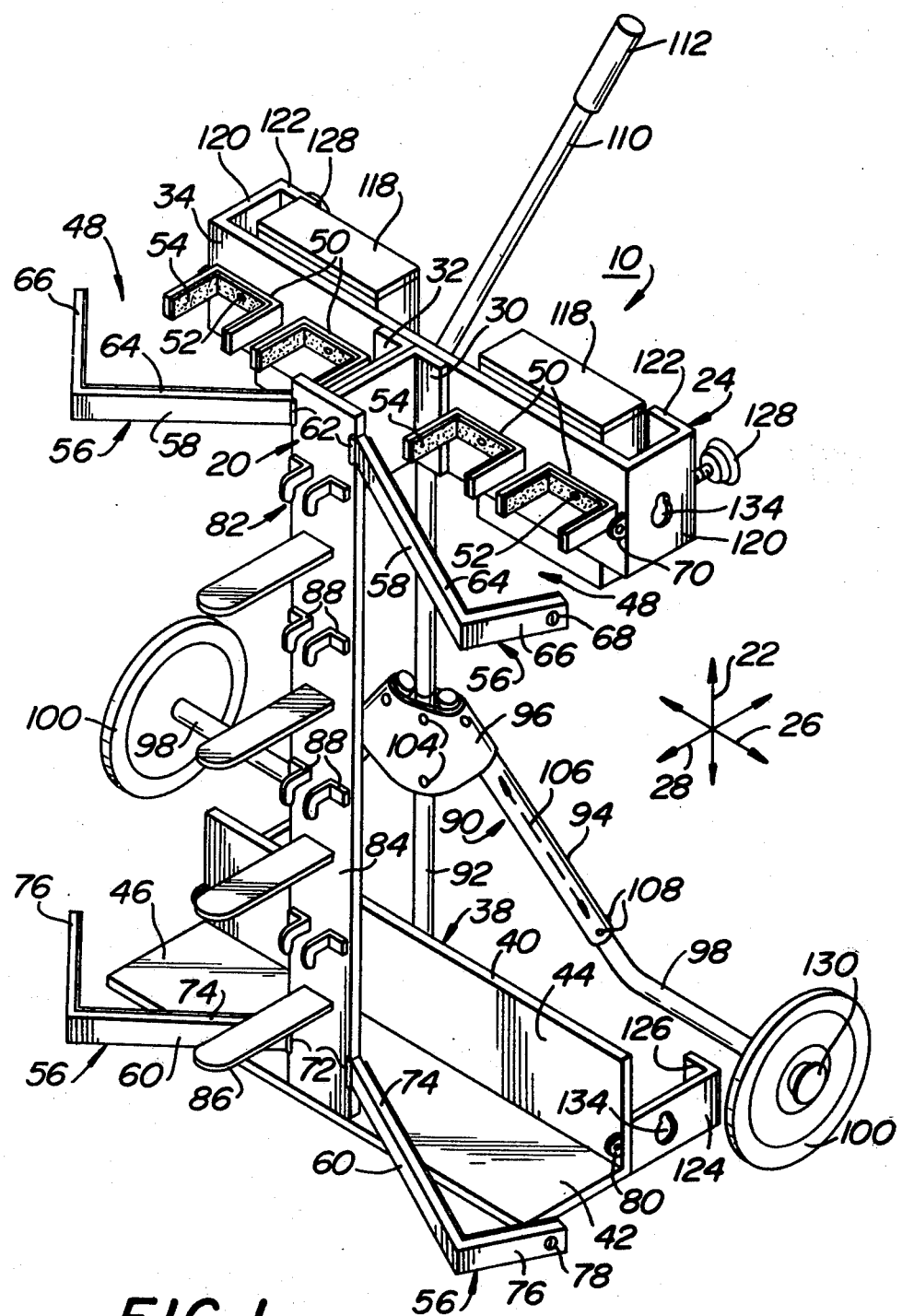
FIG. 1 is a perspective view of the ski accessory transportation and storage system.
Figure 2:
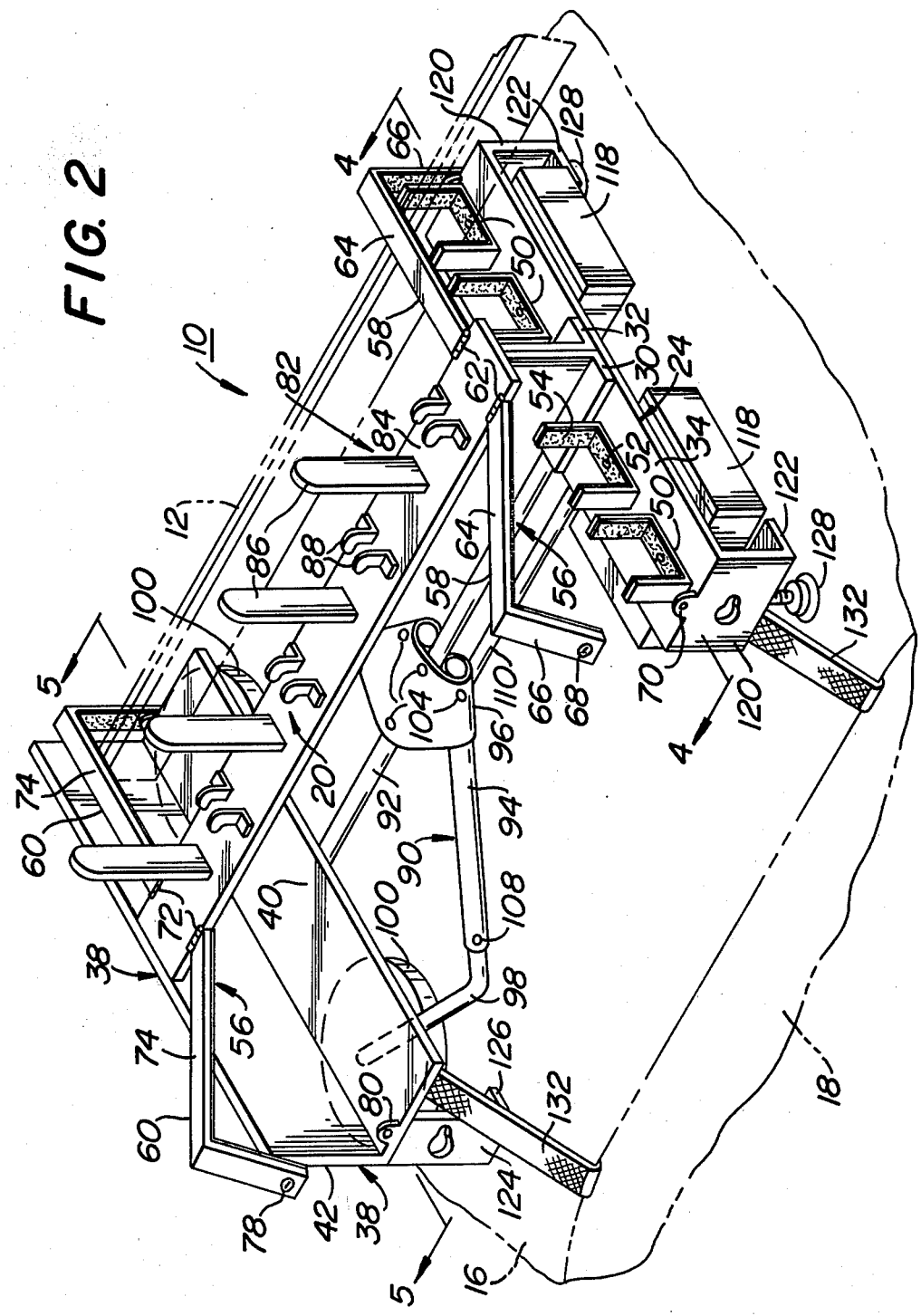
FIG. 2 is a perspective view of the ski accessory transportation and storage system mounted on the roof of a vehicle.
Figure 3:
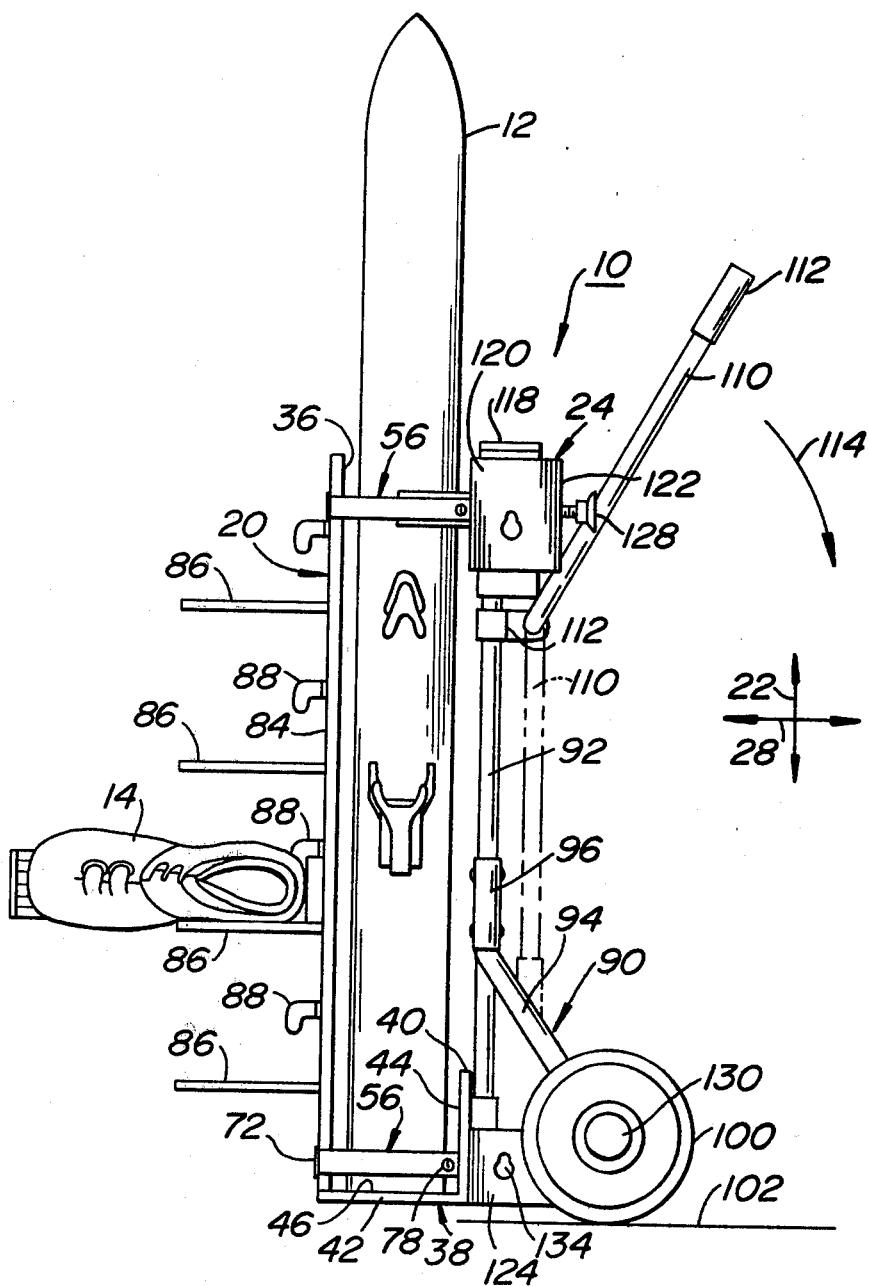
FIG. 3 is an elevational view of the ski accessory transportation and storage system, showing skis mounted within the overall system.

Referring now to FIGS. 1-3, there is shown ski accessory transportation and storage system 10 for transportation and storage of skis 12 and various ski paraphernalia, such as ski boots 14 shown in FIG. 3. As will be seen in the following paragraphs, transportation and storage system 10 is adapted for use in the environment of a skier. System 10 holds or constrains various ski paraphernalia and is rollingly displaced to the area of use by the skier. The ski paraphernalia is maintained in predetermined positional locations within transportation and storage system 10 in order that the skier is easily able to locate all items of need when he or she reaches the skiing destination. System 10 allows for all of the various ski paraphernalia contained therein to be moved by the user in a golf-like caddie vehicle system. Additionally, ski accessory transportation and storage system 10 is adapted for attachment to roof 16 of vehicle 18, as is shown in FIG. 2. Still further, system 10 is adapted for storage of the contained ski paraphernalia during a non-skiing season of the year.

Transportation and storage system 10 includes central frame member 20 extending substantially in vertical direction 22, as is seen in FIGS. 1 and 2. In general, central frame 20 is rectangular in contour and simulates a board-like planar extension in vertical direction 22. Central frame 20 may be formed of wood or metal, such as aluminum or some like material not important to the inventive concept as is herein described, with the exception that the composition of central frame member 20 must have structural quality sufficient to accept the load bearing forces applied by the contained structure of system 10, as well as the stored ski paraphernalia.

System 10 further includes upper support member 24 secured to central frame member 20 and itself extending in transverse direction 26 with respect to vertical direction 22. Thus, upper support member 24 in combination with central frame member 20 forms substantially a T-contour when viewed from a frontal perspective. For purposes to be described in following paragraphs, upper support member 24 is displaced from central frame member 20 in longitudinal direction 28 by a pair of channel members 30 and 32, as is shown in FIG. 1.

Channel members 30 and 32 are secured on opposing ends thereof to upper support member frontal face 34 and to rear face 36 of central frame member 20. Channel members 30 and 32 may be welded, bolted, screwed, or otherwise fixedly secured to upper support member 24 and central frame member 20 in any well-known manner.

The overall housing of system 10 includes lower support member 38 which is fixedly secured to central frame member 20. Lower support member 38 extends in transverse direction 26, similar to upper support member extension 24 and is displaced from upper support member 24 in vertical direction 22. Lower support member 38 is L-shaped in contour and includes vertically directed leg section 40 and longitudinally directed leg section 42. The longitudinal extension of leg section 42 is substantially equal to the longitudinal extension of channel members 30 and 32 in order that lower support member frontal face 44 is in vertical alignment with upper support member frontal face 34. Central frame member 20 is secured to longitudinally directed leg section 42 through either bolting, welding, or some like technique to provide fixed securement therebetween. As can be seen in FIG. 3, skis 12 or other vertically directed ski paraphernalia such as ski poles, interface with upper surface 46 of longitudinally directed leg section 42 by gravity assist. In this manner, central frame member 20, upper support member 24, and lower support member 38 are formed into an overall rigid housing structure.

Ski capturing mechanism 48 is utilized for capturing and containing skis 12 and other longitudinally extended paraphernalia between upper support member 24, lower support member 38, and central frame member 20. Ski capturing mechanism 48 includes a plurality of ski bracket members 50, positionally located on opposing transverse sides of central frame member 20. Ski bracket members 50 are secured to upper support member 24 through ski bracket member bolts 52 or some like mechanism. As can be seen in FIGS. 1 and 3, ski bracket members 50 are adapted for insert of skis 12 extending in vertical direction 22. Ski bracket members 50 are generally U-shaped in contour for insert of vertically directed skis 12, where skis 12 extend to upper surface 46 of leg section 42 to be fixedly positioned. The inner surfaces of U-shaped ski bracket members 50 may have attached thereto resilient material 54 such as foam plastic, or rubber, in order that skis 12 will not be damaged during transportation when being constrained within bracket members 50. Resilient material 54 may be attached to bracket members 50 through adhesive or some like mechanism, not important to the inventive concept as is herein defined and described.

Ski capturing mechanism 48 further includes ski locking mechanism 56 which is coupled to central frame member 20 and releasably coupled to upper support member 24, as well as lower support member 38 for constraining skis 12 within ski bracket members 50. Ski locking mechanism 56 includes a pair of upper ski locking bar members 58 and a similar pair of lower ski locking bar members 60, as is clearly seen in FIG. 1. Upper and lower ski locking bars 58 and 60 are rotationally coupled to central frame member 20 and lockingly engageable to one end of upper support member 24 and lower support member 38, respectively. Upper ski locking bars 58 are rotationally coupled to central frame member 20 by upper hinges 62 allowing for locking bars 58 to be rotationally displaced about an axis coincident with vertical direction 22. Each upper ski locking bar 58 is L-shaped in contour and is formed of upper transversely extending leg section 64 and longitudinally extending leg section 66. The longitudinally extending leg sections 66 include upper lock mechanisms 68 for locking upper ski locking bars 58 to upper support member 24 when skis 12 are vertically inserted within ski bracket members 50. Upper lock mechanisms 68 are releasably coupled to upper lock flanges 70, secured to upper support member 24. Upper lock mechanisms 68 may be any one of well-known commercially available key-actuated lock systems.

Lower ski locking bars 60 include lower hinge members 72 to allow rotational displacement of bar members 60 about an axis coincident with vertical direction 22. Further, lower locking bars 60 provide for transversely extending leg sections 74 and longitudinally extending leg sections 76 in the same manner as provided for upper ski locking bar members 58. Lower lock mechanisms 78 cooperate with lower lock flanges 80 to provide constrainment of skis 12 within brackets 50, similar to that shown and described for upper lock mechanisms 68 in cooperation with upper lock flanges 70.

Thus, it is seen that skis 12 may be inserted within ski bracket members 50 to rest by gravity assist on upper surface 46 of leg section 42. Upper ski locking bar members 58 and lower ski locking bar members 60 may be rotationally displaced about hinges 62 and 72 until upper lock mechanisms 68 and lower lock mechanisms 78 are in transverse alignment with upper lock flanges 70 and lower lock flanges 80. Locking mechanisms 68 and 78 may be key actuated to form a constrained relation between locking bars 58 and 60 and upper support member 24 and lower support member 38, respectively. In this manner, skis 12 are positionally located in constrained alignment within overall ski accessory transportation and storage system 10.

System 10 further includes ski boot mounting mechanism 82 secured to central frame member frontal face 84 for releasably coupling ski boots 14 to central frame member 20. Ski boot mounting mechanism 82 includes ski boot platform 86 extending from central frame member frontal face 86 in longitudinal direction 28. Additionally, a pair of hook brackets 88 secured to central frame frontal face 84 captures ski boots 14 between ski boot platform 86 and hook brackets 88. In this manner, ski boots 14 may be releasably mounted to system 10, as is shown in FIG. 3.

Referring to FIGS. 1 and 3, it is seen that ski accessory transportation and storage system 10 includes wheel mechanism 90 coupled to upper support member 24 and lower support member 38 to provide rolling displacement of system 10 on base surface 102. Wheel mechanism 90 includes vertically extending central post 92, secured to both upper and lower support members 24 and 38, respectively. Central post 92 is fixedly secured to members 24 and 38 through bolts, nuts, welding, or some like technique. Central post member 92 lies in a substantially parallel plane with respect to the vertical extension of upper support member 24, as is clearly seen in FIGS. 1 and 3.

Skewed post members 94 are coupled to central post member 92 and are inclined with respect thereto, as is shown in FIG. 1. Clamp member or wheel clamp 96 is fixedly secured to central post member 92 and surrounds skewed post members 94. As is seen, wheel clamp 96 is fixedly secured through clamp bolts 104 to central post member 92. Skewed post members 94 are inclined at an acute angle to the vertical extension of central post member 92 and are further angled rearwardly in a direction away from central frame member 20. The extension of skewed post members 94 defines a skewed post axis line 106, shown in phantom line drawing in FIG. 1 for purposes of definition in following paragraphs.

Figure 4:
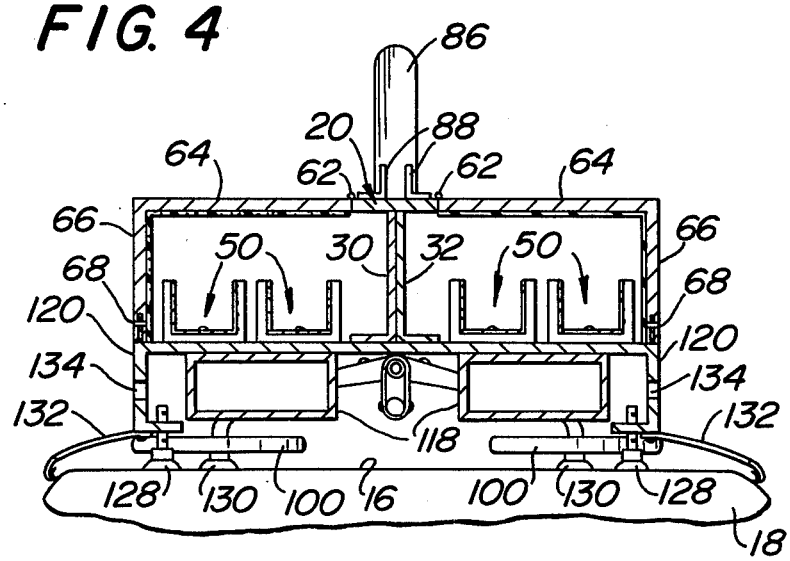
FIG. 4 is a sectional view of the ski accessory transportation and storage system, taken along the section lines 4—4 of FIG. 2; and, FIG. 5 is a sectional view of the ski accessory transportation and storage system taken along the section lines 5—5 of FIG. 2.
Figure 5:
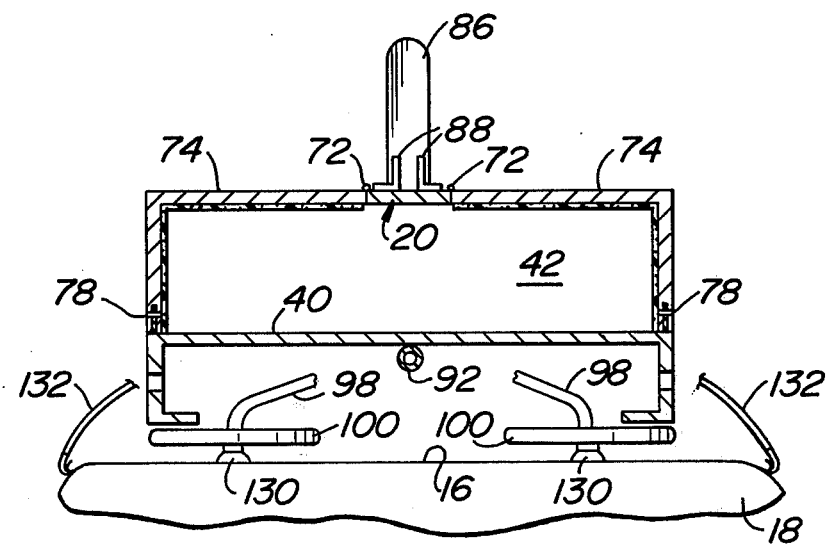

Wheel post members 98 are insertable within skewed post members 94 and rotatable about axis line 106 of skewed post members 94. Wheel posts 98 are maintained in fixed alignment with respect to skewed post members 94 through wheel set screws 108. Wheel set screws 108 may be utilized for providing a releasable contact between wheel post 98 and skewed post members 94. It is to be understood that wheel set screws 108 may be pin members passing through aligned openings in wheel post members 98 and skewed post members 94, or some like securement mechanism which allows removability and rotation of wheel post members 98 about axis line 106. Rotational displacement of wheel post members 98 allows wheel members 100 to be folded back in a stored position for attachment to roof 16 of vehicle 18, as is shown in FIGS. 2, 4 and 5. Thus, the rotational capability of wheel post members 98 allows for a compact system 10 to be stored on vehicle 18 during transportation over a relatively long distance. Additionally, the stored position of wheel members 100 and associated wheel post members 98, allows for storage of system 10 during an off-season where system 10 may be mounted in a storage cabinet. When the user reaches a particular destination, storage system 10 is removed from vehicle roof 16 and wheel posts 98 insertable within skewed post members 94 are rotated to an open or displacing position, as is shown in FIGS. 1 and 3. Set screws 108 are secured to provide constrainment between wheel post members 98 and skewed posts 94 in order that system 10 may be rollingly actuated along base surface 102.

Handle member 110 is rotationally coupled to central post member 92 through coupling flange 112. Handle member 110 is used for pushing or pulling system 10 on base surface 102. Additionally, handle member 110 is rotationally actuatable in a direction defined by rotational arrow 114 to permit handle member 110 to be rotated to a vertical position, shown in phantom line drawing in FIG. 3. In this manner, handle member 110 may also be stored in a compact manner when being transported over long distances or being stored in an off-season. Handle member 110 includes hand grip 112 generally formed of a resilient material and slidingly engaged in fixed relation over handle member 110 to provide a gripping section for the user.

It is to be understood, that handle member 110 may be coupled through well-known linkage systems to skewed post members 94 to provide appropriate rotation of skewed post members 94 upon actuation of handle member 110 in the direction shown by rotational arrow 114. Thus, it is clearly seen that through utilization of a four bar linkage system, that displacement of handle member 110 may automatically cause skewed posts 94 to be rotated inwardly to aid in a storage position. However, whether the rotation is provided through an automatic linkage mechanism or manually, as has been shown and described in the preceding paragraphs, the important concept is that wheel posts 98 in combination with skewed post members 94 provide the ability of wheel members 100 to be rotated to a position clearly shown in FIGS. 4 and 5 for storage purposes.

System 10 further includes storage box members 118 fixedly secured to upper support member 24 for containment of various paraphernalia. Storage box members 118 may be mounted to the rear surface of upper support member 24 through bolts, clamps, or some like technique. Thus, the skier or user may use storage box members 118 for insert of gloves, socks, or other like ski paraphernalia.

Upper support member 24 further includes channel side wall members 120 and channel rear wall members 122, as is shown in perspective in FIG. 1. Channel side wall and rear wall members 120 and 122 may be formed in one-piece formation with the frontal planar extension of upper support member 24 to provide an overall C-contour when taken in horizontal cross-sectional view. Additionally, lower support member 38 may include flange side wall member 124 and flange rear wall 126, as is shown in FIG. 1. Both the flange side wall and rear wall members 124 and 126 of lower support member 38 may be welded or bolted, or otherwise fixedly secured to a rear surface of vertically directed leg section 40.

Transportation system 10 further includes a releasable securement mechanism which is fixedly secured to upper support member 24 and wheel members 100 for securing transportation and storage system 10 to an external surface, such as vehicle roof 16, shown in FIGS. 2, 4 and 5. The releasable securement mechanism includes a first pair of vacuum cups 128 extending rearwardly from channel rear wall members 122, shown in FIGS. 1 and 3. Additionally, second vacuum cup members 130 are secured to wheel members 100 for interface with external surface or vehicle roof 16. Thus, when wheel members 100 are rotationally folded into the stored position, as shown in FIGS. 2, 4 and 5, second vacuum cup members 130 interface with vehicle roof 16 to provide a suction contact.

Further turning to FIGS. 2, 4 and 5, there are shown strap members 132 which are coupled to both upper support member 24 and lower support member 38 to provide additional constrainment of system 10 to vehicle roof 16. Strap members 132 may include hook ends for grasping of the gutter mounts, commonly found on vehicles.

Eyeholes 134 may be formed in both channel side wall members 120 and flange side wall members 124, as is shown in FIGS. 1 and 3. Eyeholes 134 may be used for storing system 10 during a prolonged period of storage, possibly during an off-season. Hook members may be inserted within eyeholes 134 and the entire system 10 mounted on a pegboard wall or some like storage containment system. It is to be understood that eyeholes 134 are merely representative of openings within which hook members may be used for purposes of storage. It is to be understood that such eyeholes 134 may be formed in the channel rear wall members 122 and flange rear wall members 126 to accomplish substantially the same purposes and objectives of storage.

Although this invention has been described in connection with specific forms and embodiments thereof, it will be appreciated that various modifications other than those discussed above, may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:

1. A ski accessory transportation and storage system for transportation and storage of skis and ski paraphernalia, comprising:
   (a) a central frame member extending substantially in a vertical direction;
   (b) an upper support member secured to said central frame member and extending in a transverse direction with respect to said vertical direction;
   (c) a lower support member secured to said central frame member, said lower support member extending in said transverse direction and being displaced from said upper support member in said vertical direction, said lower support member being L-shaped in contour having a vertically directed leg section and a longitudinally directed leg section;
   (d) ski capturing means for capturing said skis between said upper support member, said lower support member and said central frame member, said ski capturing means including a ski bracket member being U-shaped in contour and secured to said upper support member for insert of at least one ski extending in said vertical direction and ski locking means coupled to said central frame member and releasably coupled to said upper and lower support members for constraining said ski within said ski bracket member; and,
   (e) wheel means coupled to said upper and lower support members for rolling displacement of said ski accessory transportation and storage system, said ski locking means including an upper ski locking bar member rotationally coupled to said central frame member and lockingly engageable to one end of said upper support member and a lower ski locking bar member rotationally coupled to said central frame member and lockingly engageable to one end of said lower support member.

2. The ski accessory transportation and storage system as recited in claim 1, where said upper and lower ski locking bar members are L-shaped in contour, each of said ski locking bar members having a transversely extending leg section and a longitudinally extending leg section.

3. The ski accessory transportation and storage system as recited in claim 2 where said upper ski locking bar member includes lock means for locking said ski locking bar member to said upper support member when said skis are vertically inserted in said ski bracket member.

4. The ski accessory transportation and storage system as recited in claim 1 including ski boot mounting means secured to a frontal face of said central frame member for releasably coupling said ski boots to said central frame member.

5. The ski accessory transportation and storage system as recited in claim 4, where said ski boot mounting means includes:
   (a) at least one ski boot platform member extending from said central frame member frontal face in said longitudinal direction; and,
   (b) at least a pair of hook brackets secured to said central frame frontal face for capturing said ski boots between said ski boot platform and said hook brackets.

6. The ski accessory transportation and storage system as recited in claim 1, where said wheel means includes:
   (a) a vertically extending central post secured to said upper and lower support members;
   (b) a pair of skewed posts coupled to said central post, each of said skewed posts having an axis line;
   (c) a pair of wheel posts rotationally displaceable about said axis lines of said skewed posts; and,
   (d) a pair of wheel members rotationally displaceable with respect to said wheel posts.

7. The ski accessory transportation and storage system as recited in claim 6, including a handle member coupled to said central post and being rotationally displaceable with respect thereto about a transversely directed axis line.

8. The ski accessory transportation and storage system as recited in claim 1, including at least one box member fixedly secured to said upper support member for containment of said paraphernalia therein.

9. A ski accessory transportation and storage system for transportation and storage of skis and ski paraphernalia comprising:
   (a) a central frame member extending substantially in a vertical direction;
   (b) an upper support member secured to said central frame member and extending in a transverse direction with respect to said vertical direction;
   (c) a lower support member secured to said central frame member, said lower support member extending in said transverse direction and being displaced from said upper support member in said vertical direction;
   (d) ski capturing means for capturing said skis between said upper support member, said lower support member and said central frame member;
   (e) wheel means coupled to said upper and lower support members for rolling displacement of said ski accessory transportation and storage system; and
   (f) releasable securement means fixedly secured to said upper support member and said wheel means for securing said transportation and storage system to an external surface.

10. The ski accessory transportation and storage system as recited in claim 9, where said releasable securement means includes:
    (a) a first pair of vacuum cup members secured to said upper support member; and,
    (b) a second pair of vacuum cup members secured to said wheel means for interface with said external surface.

11. The ski accessory transportation and storage system as recited in claim 10, including strap means coupled to said upper and lower support members for securing said system to a vehicle top.

* * * * *